Figure 1:
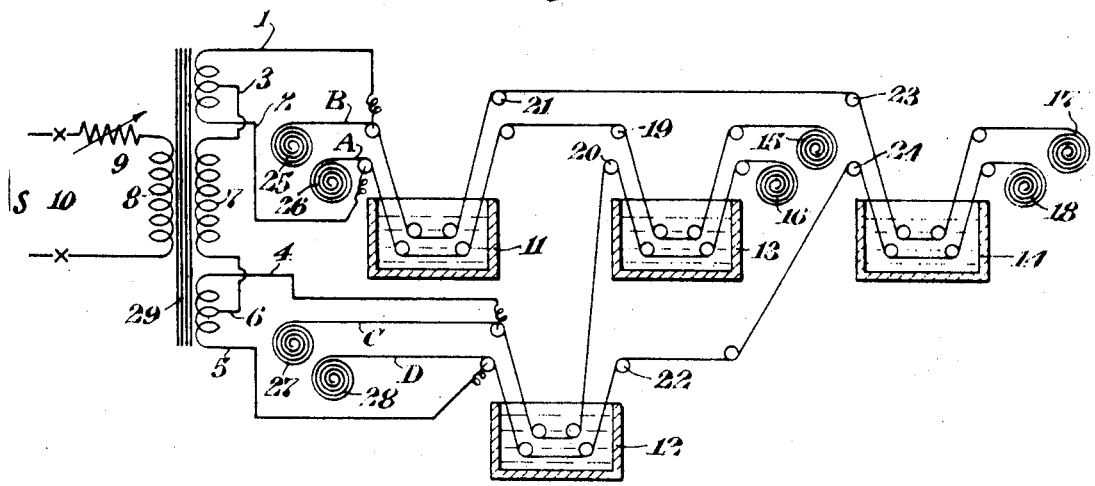

Nov. 9, 1937.  P. R. COURSEY ET AL  2,098,774
ELECTROLYTIC CONDENSER
Original Filed Jan. 12, 1933

INVENTORS
Philip Ray Coursey
Clifford Herbert Marcus
Edwards, Bower & Pool
ATTORNEYS Patented Nov. 9, 1937

2,098,774

UNITED STATES PATENT OFFICE 2,098,774

ELECTROLYTIC CONDENSER

Philip Ray Coursey, Surrey, England, and Clifford Herbert Marcus, New York, N. Y., assignors to Dubilier Condenser Corporation, New York, N. Y., a corporation of Delaware Application January 12, 1933, Serial No. 651,248 In Great Britain January 16, 1932. Renewed October 6, 1936

8 Claims. (Cl. 204—1)

The invention relates to an improved method for producing electrically insulating coatings on metals or metallic articles, and to means for the manufacture of such coatings. It relates also to the use of these coatings in the manufacture of specific articles such for example as electrical condensers, insulated coil windings and other devices in which insulated electrical conductors may be employed, and has for its object the improvement of such devices whereby their insulation is better able to withstand higher operating voltages.

It is known that insulating coatings may be formed on certain metals by chemical or electrochemical means, and this invention is concerned in particular with such coatings. For example, insulating coatings may be formed by electrochemical treatment of aluminium in an electrolyte such for example as a solution of sodium borate, the current being passed through the solution in such direction as will make the aluminium the anode of the electrolytic cell, thus forming a film of aluminium oxide on the surface of the metal. Such films, however, frequently lack homogeneity, and are not able to withstand an applied voltage of more than one or two hundred volts without breakdown of their insulating qualities.

The manufacture of such insulating films may be greatly improved so that they are able to withstand higher voltages without breakdown, by subjecting the metal to a dual forming process. Preferably also two different electrolytes are used, while the voltages applied to the electrolytic cells (of which the metal to be coated forms one or both electrodes) may likewise be different and may be adjusted to suit the nature of the electrolyte employed in each case. The nature of the electrolyte used in each case should likewise depend upon the nature of the metal on which the insulating coating is to be deposited.

In a preferred form of the invention, for the production of insulating coatings or films on aluminium foils, sheets, wires, rods etc., two pieces of the metal are suspended, separated from each other, in a dilute solution of sulphuric acid, and an alternating current passed through the solution between them. The intensity of the current passed through the solution during this treatment should be sufficient for an evolution of gas to take place at both electrodes. The passage of the alternating current serves the dual purpose of scouring or clearing the metal during the half cycles of the current flow at which hydrogen or nascent hydrogen is evolved on the surface, and of producing a film of oxide during the other half cycles when oxygen is liberated.

The metal pieces are subjected to a second forming treatment in a suitable solution which may for example consist of ammonium borate, or similar compound or compounds in any desired proportion of concentration, this forming being carried out with alternating current of higher voltage than that to which the films or coatings are subsequently required to operate.

For the purpose of manufacturing the insulating coatings on sheets of aluminium foil for building into electrolytic condensers, the voltage applied between the electrodes in the first forming treatment may be a relatively low voltage of the order of 20 to 30 volts R. M. S. while in the second forming treatment a relatively high voltage such as 750 to 1,000 volts may be used. After removal from the solution the metal foils may be assembled up to form a condenser using paper, linen, or other convenient spacer which may be used to support or to contain an electrolyte or electrolytic solution to serve the purpose of making electrical connection to the outer surface of the insulating or dielectric film on the aluminium. This electrolyte may be the same as or different from either of the two electrolytes heretofore mentioned.

Condensers manufactured in this way show a low leakage current, so that in consequence the condensers are more stable and less subject to deterioration.

Likewise for insulating aluminium wires or conductors used for winding coils and the like, a similar process may be used for forming the insulating coating on the metal before winding it into the coil or other apparatus.

In order to facilitate the manufacture of the insulating coating on long lengths of metal wire, foil, etc., the said strips or wires may be passed continuously through vessels containing the appropriate electrolytic solutions, while the desired alternating voltages are maintained between the strips of metal. Since in general the voltage required between the strips is different in the two treatments, it is desirable to make use of four such strips A, B, C, D, which are passed continuously through four sets of treatment vats or vessels. Thus strips A and B form one pair subjected to a low voltage in a vessel containing the electrolyte for the first treatment while strips C and D likewise form a similar pair passing through a similar first treatment vessel.

For the second treatment the pairs of strips are rearranged so that strips A and C form a pair passing through a vessel containing the electrolyte for the second treatment, and likewise strips B and D are similarly grouped to form a pair passing through another vessel for the second treatment. By this means it is possible to maintain the desired high voltage between the strips A and C and also between the strips B and D for the second treatment, without disturbing the low voltage which is maintained between the strips of the pairs A—B and C—D. It is understood that in the arrangement of this apparatus, washing tanks and/or other treatments may be interposed between the main electrolytic treatment vessels, or follow or precede same, without departing from the general principle of the arrangement for dual treatment of the metal strips. It is understood also that where the word strip has been used, this is a general term covering wires, or other elongated forms of the material.

In Fig. 1 of the accompanying drawing, according to the preferred form of the invention referred to, two pairs of wires or strips A, B and C, D, are shown. These are arranged on four bobbins or coils 25, 26, 27, 28, from which the strips are unwound so as to pass over the end rollers or guides by means of which they are caused to dip down into tanks or vessels 11, 12, 13, 14, containing the electrolyte used for the forming processes.

The pair of strips A and B pass first down through the vessel 11, while simultaneously the strips C and D pass down through the vessel 12. In these two vessels they are subjected to the first-mentioned forming treatment by means of current derived from the windings 1, 2 and 4, 5 respectively of the transformer 29, the ends of which are connected as shown to the strips A, B and C, D respectively.

After emergence from the treatment vessels 11, 12, the strips are re-arranged so that one strip C from the lower vessel 12, together with one strip A from the upper vessel 11, are taken together over guides 19, 20, into the common bath or treatment vessel 13, and likewise the remaining pair of strips D from vessel 12 and B from vessel 11 are taken over rollers 21, 22 and 23, 24 down into the second treatment vessel 14. In these vessels 13, 14 the voltage applied between the strips is derived from the third winding 7 on the transformer 29, this winding being connected between the tapping points 3 and 6 on the before-mentioned pair of windings 1, 2 and 4, 5 which are connected directly between the first pairs of strips A, B and C, D. By thus re-arranging the order of the strips in their passage through the baths it is possible to obtain a certain voltage and current density as derived from the outer windings of the transformer 29 in the first treatment baths 11 and 12, and an entirely different voltage and current density from the winding 7 in the second treatment baths 13 and 14, without any disturbance of one treatment by the other. The four vessels 11, 12, 13, 14 must be held on insulating supports to prevent any stray current leakage between them, unless they are themselves constructed of or lined with insulating material. The energy supply for the forming process is derived from the source S of alternating current through the main switch 10 to the primary winding 8 of the transformer 29. Preferably also a regulating resistance 9 is incorporated to control the voltage applied to the treatment baths.

After their passage through the baths the four strips are wound up on spools or bobbins 15, 16, 17, 18 which are preferably also provided with suitable driving means by which the strips are drawn steadily through the treatment baths.

Intermediate treatment such as washing or other chemical treatment of the strips may be applied intermediately between the baths 11, 13 and 12, 14 or before or after the entrance or exit of the strips through the baths to facilitate the electrolytic treatment and to wash off the electrolyte from the strips or wires. By this means the passage over of solution from one bath to the other can be prevented.

The relative arrangement of the strips passing through the vessels 11, 12, 13 and 14; and the relative positions of these vessels may be varied from that shown in the diagram, which is intended to be illustrative in a general way only. For instance, in lieu of the arrangement of the strips above each other in the vessels, they may be disposed side by side, thus enabling a more compact grouping of the vessels to be made.

Alternatively to the arrangement of current supply as shown in the diagram, the voltage between the points 3 and 6 may be derived from a separate transformer in lieu of the use of the winding 7 on the transformer shown so as to facilitate separate control of the two treatments; while as a further alternative, this winding may be replaced by a source of D. C. voltage, so that one of the treatments is by means of direct current, while the other is for alternating current.

As a further alternative, the voltage supplied from the transformer windings 1, 2 and 4, 5 may be replaced by D. C. supplies, while retaining the A. C. supply from the winding 7.

As a further modification of the invention, one or other of the forming processes comprising the basis of this invention may be sub-divided into two or more parts which may be carried out at different voltages or with differing electrolytes. In this case the number of strips or pairs of strips may be increased appropriately so as to maintain the desired isolation between the various voltages when the strips are grouped into differing pairs for the successive forming treatments.

Figure 2:
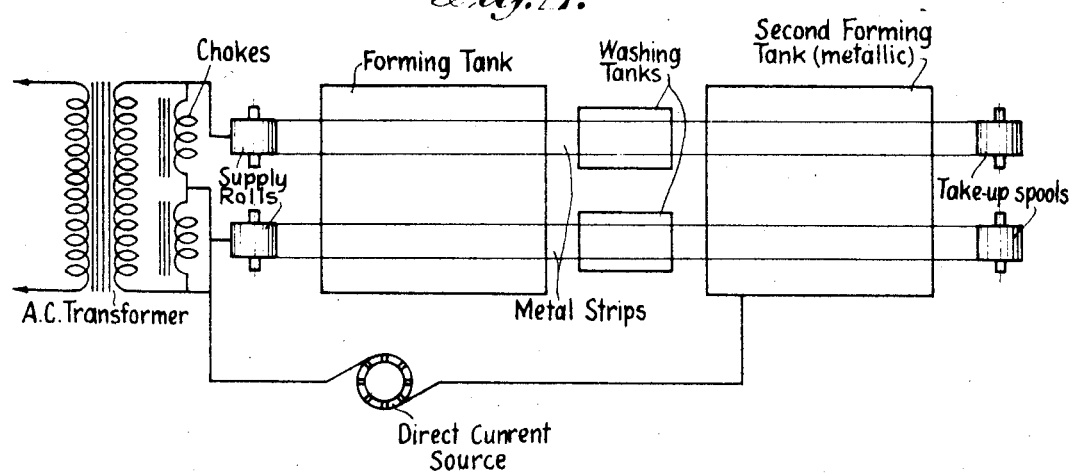

The separation of the voltages for these treatments may also be effected by the use of direct current in place of alternating currents for one or more of the forming treatments, so that chokes and/or condensers may be utilized to prevent the flow of one type of current through the other current source or circuits. An example is shown in Fig. 2 of the drawing.

The strips after removal from the treatment vessels, etc., may be wound up on reels or in other form, or used directly for the preparation of condensers, coils, or other devices as desired.

Although this process of manufacturing the resulting film or coating has been described primarily in connection with the metal aluminium, it is to be understood that the invention is not limited to such material, but that it may be used with any other metal on which a coating can be formed by electro-chemical treatment.

We claim:

1. The continuous process of electrolytically forming oxide coatings upon aluminum surfaces which comprises treating at least four aluminum elements in the following manner: immersing the first and second elements as a pair in an electrolytic solution and establishing primary alternating potential therebetween of sufficient strength to form a film upon said elements; immersing the third and fourth elements as a pair in a second electrolyte solution and establishing a second primary alternating potential therebetween of sufficient strength to form a coating upon said elements, establishing a secondary alternating potential of substantially greater magnitude than said primary potential between the first named pair and a second named pair, removing the elements from their respective baths; immersing said first element and said third element as a pair in an electrolytic solution whereby said pair will be subjected to an electrolytic treatment due to the action of said secondary potential and similarly immersing said second and fourth elements in an electrolytic bath whereby a similar treatment is effected.

2. The continuous process of electrolytically forming coatings upon metallic surfaces which comprises treating at least four metallic elements in the following manner: immersing the first and second elements as a pair in an electrolytic solution and establishing primary alternating potential therebetween of sufficient strength to form a film upon said elements; immersing the third and fourth elements as a pair in a second electrolyte solution and establishing a second primary alternating potential therebetween of sufficient strength to form a coating upon said elements, establishing a secondary alternating potential of substantially greater magnitude than said primary potential between the first named pair and a second named pair, removing the elements from their respective baths; immersing said first element and said third element as a pair in an electrolytic solution whereby said pair will be subjected to an electrolytic treatment due to the action of said secondary potential and similarly immersing said second and fourth elements in an electrolytic bath whereby a similar treatment is effected.

3. The continuous process of electrolytically forming coatings in plural layers on elongated metallic film forming elements which comprises subjecting a pair of said elements simultaneously to electric potentials, one of relatively low voltage applied between said elements and the other of relatively high voltage applied to both said elements while the elements are immersed at different portions thereof in separate electrolytic solutions, and continuously passing said elements at predetermined speed through the separate solutions in succession, whereby each element receives the same coating in each solution.

4. The continuous process of electrolytically forming coatings in plural layers on film forming metallic elements which comprises subjecting a pair of said elements simultaneously to two electric currents of different potentials and in separate electrolyte solutions of different compositions, one potential being of the order of 30 volts and impressed between said elements, the other potential being of the order of several hundred volts and applied to both elements, whereby the elements are immersed at two separate portions of their length in the forming solutions, and continuously passing the elements at a predetermined speed through said solutions in succession.

5. The continuous method of producing electrically insulating coatings on film forming metallic articles of elongated form by electrolytic action comprising subjecting two pairs of said articles to plural formation of the coatings in successive steps by continuously passing said articles in succession through a plurality of electrolytic forming baths whereby the articles are immersed at different portions of their length in the separate electrolytes, applying an alternating current potential between each pair of said articles to form a first coating thereon, interchanging one article of each pair and applying a second alternating current potential of different magnitude between each of the new pairs thus formed to form a second coating thereon.

6. The continuous method of producing electrically insulating coatings on film forming metallic articles of elongated form by electrolytic action comprising subjecting a pair of said articles to plural formation of the coatings in successive steps by continuously passing said articles at a predetermined speed through a plurality of electrolytic forming baths in succession whereby the articles are immersed at different portions of their length in the separate electrolytes, applying an alternating current potential between said pair of articles to set up electrolytic action therebetween in the first of said baths, and applying a direct current to both articles to give them the same polarity and to set up electrolytic action with a succeeding bath, the direct current potential being of greater magnitude than the A. C. potential and applied to an electrically neutral point between said pair of articles.

7. The continuous process of electrolytically forming oxide coatings upon aluminum surfaces which comprises treating at least four aluminum elements in the following manner: immersing the first and second elements as a pair in an electrolytic solution and establishing primary alternating voltage therebetween of sufficient strength to form a film upon said elements; similarly immersing the third and fourth elements as a pair in an electrolyte solution and establishing a second primary alternating voltage therebetween of sufficient strength to form a coating upon said elements, and establishing a pair of secondary alternating voltages of substantially greater magnitude than said primary voltages between said first and said third and between said second and said fourth elements, respectively, while continuously passing the four strips through an electrolyte solution.

8. The method of forming insulating coatings on electrodes for electrolytic condensers which comprises passing an aluminum foil strip continuously and in succession through at least two film-forming operations, the first operation comprising subjecting said strip to a forming voltage of the order of 25 volts in a dilute sulphuric acid solution, the current density being sufficient to evolve gas at said strip; the last said operation comprising subjecting the preformed strip to a forming voltage many times higher than said first voltage in a borate type solution, the latter voltage being materially higher than the required operating voltage of the insulating coating.

PHILIP RAY COURSEY.
CLIFFORD HERBERT MARCUS.